United States Patent [19]

Landingham

[11] Patent Number: 4,745,091
[45] Date of Patent: May 17, 1988

[54] NOVEL COMPOSITIONS FOR OXIDE CERAMICS

[75] Inventor: Richard L. Landingham, Livermore, Calif.

[73] Assignee: Landalloy, Inc., Livermore, Calif.

[21] Appl. No.: 895,335

[22] Filed: Aug. 11, 1986

Related U.S. Application Data

[63] Continuation-in-part of Ser. No. 820,515, Jan. 17, 1986, abandoned, which is a continuation of Ser. No. 550,869, Nov. 9, 1983, abandoned.

[51] Int. Cl.$^4$ .................. C04B 35/10; C04B 35/56; C04B 35/58
[52] U.S. Cl. .......................... 501/87; 501/89; 501/92; 501/95; 501/96; 501/97; 501/127; 501/128
[58] Field of Search .............. 501/87, 89, 96, 92, 501/97, 95, 127, 128

[56] References Cited

U.S. PATENT DOCUMENTS

| | | | |
|---|---|---|---|
| 3,886,254 | 5/1975 | Tanaka et al. | 501/87 |
| 3,903,230 | 9/1975 | Kamigaito et al. | 501/97 |
| 4,010,233 | 3/1977 | Winter | 501/87 |
| 4,071,371 | 1/1978 | Milberg | 501/98 |
| 4,184,884 | 1/1980 | Jong | 501/98 |
| 4,218,253 | 8/1980 | Dworak et al. | 501/92 |
| 4,543,345 | 9/1985 | Wei | 501/95 |

Primary Examiner—Mark L. Bell
Attorney, Agent, or Firm—Limbach, Limbach & Sutton

[57] ABSTRACT

Improved ceramic tool compositions comprising primarily aluminum oxide are provided. The aluminum oxide can be supplemented with other oxides including zirconium oxide, magnesium oxide, hafnium oxide. In addition are added silicon nitride or aluminum nitride together with dispersed particles comprising carbides, nitrides and/or carbonitrides. These compositions are prepared by e.g., a reaction hot pressing process and ceramic bodies prepared in accordance with the invention display superior wear resistance to conventional tool compositions.

6 Claims, 5 Drawing Sheets

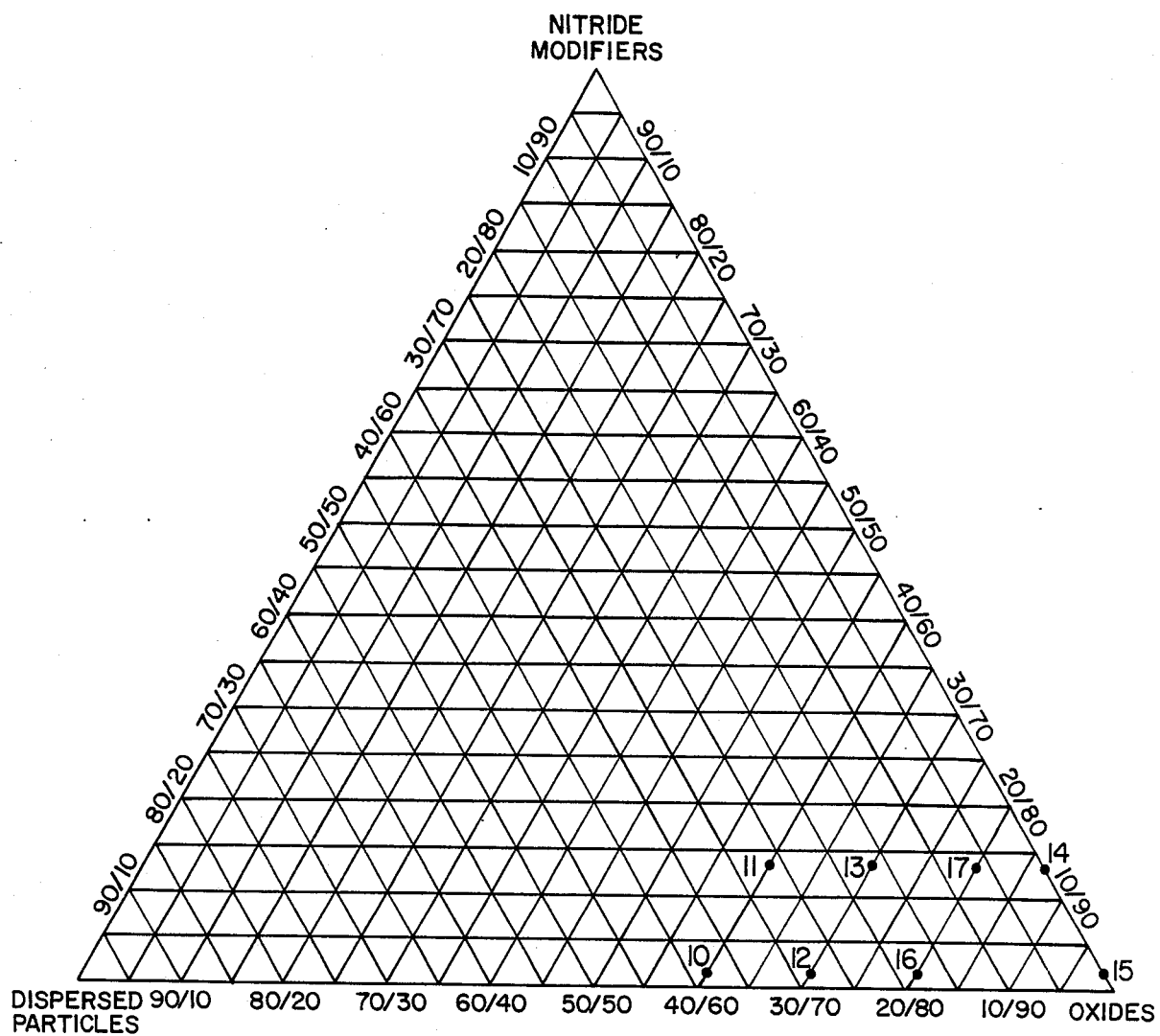
FIG._1.

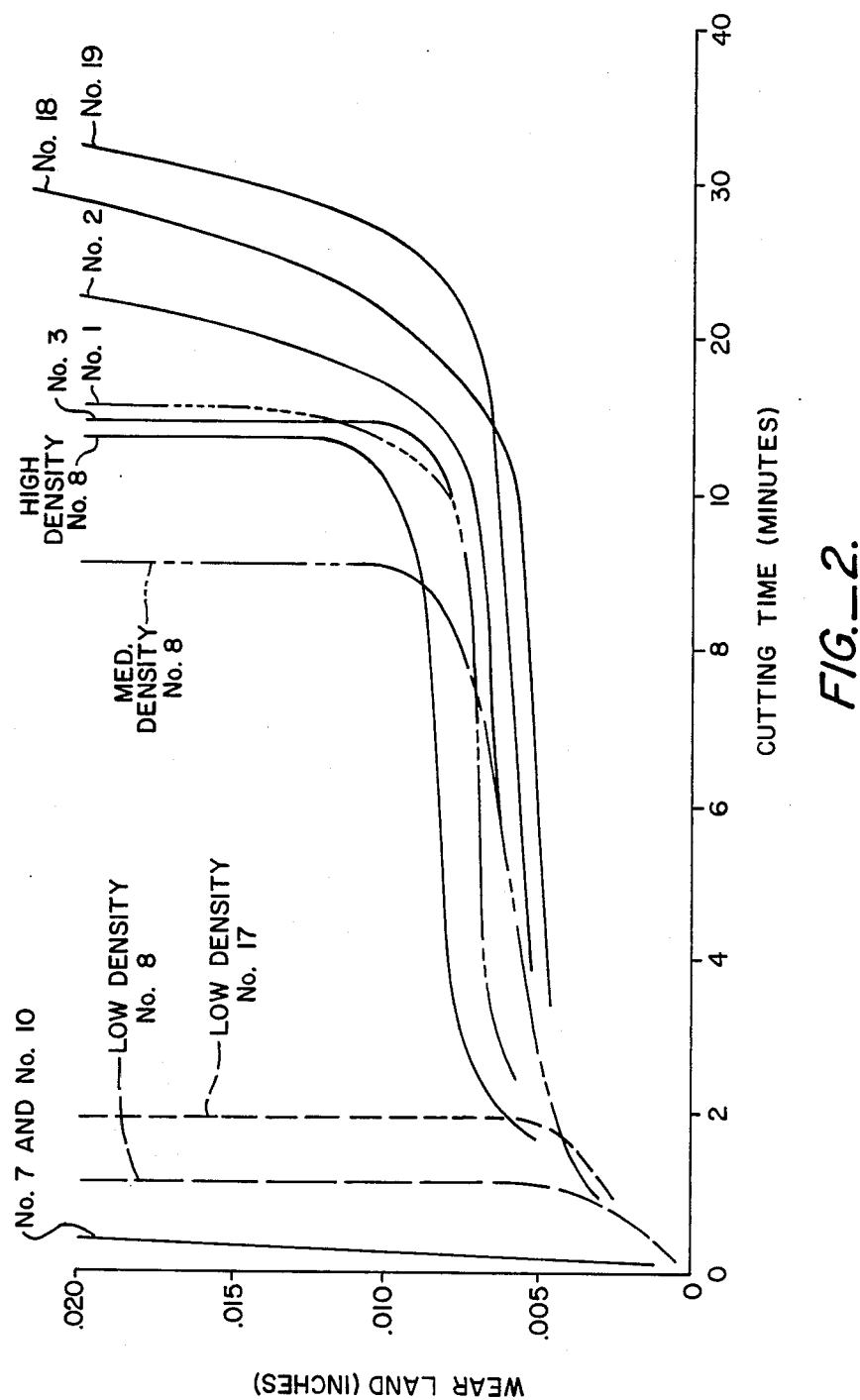
FIG._2.

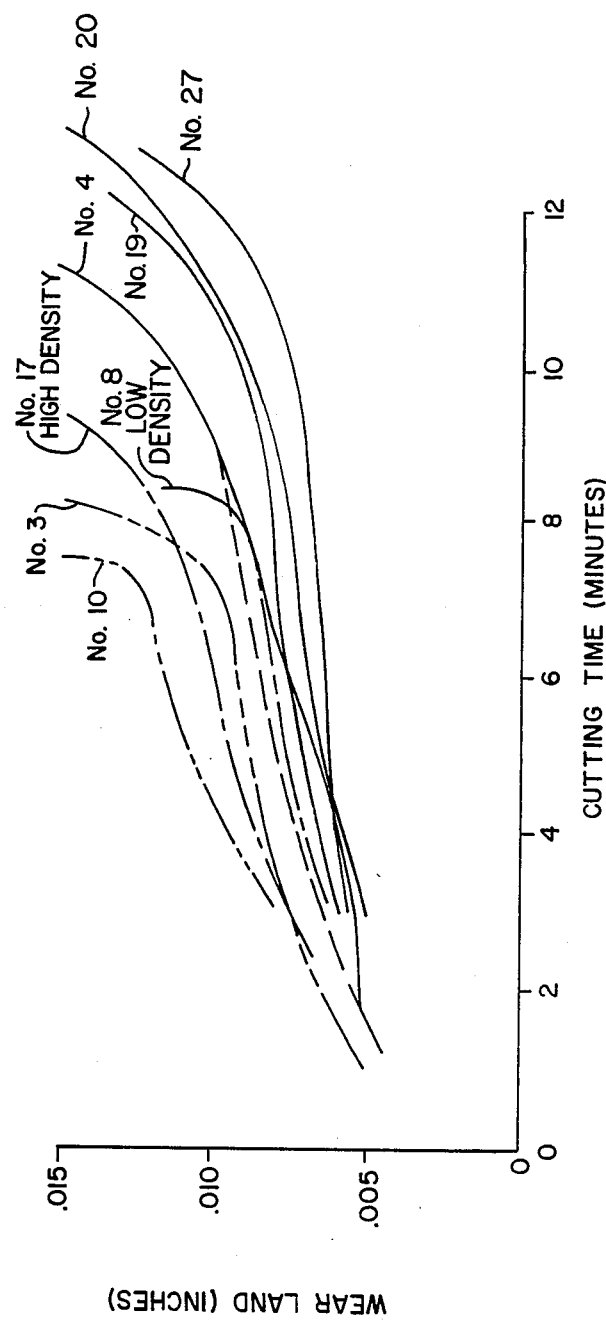

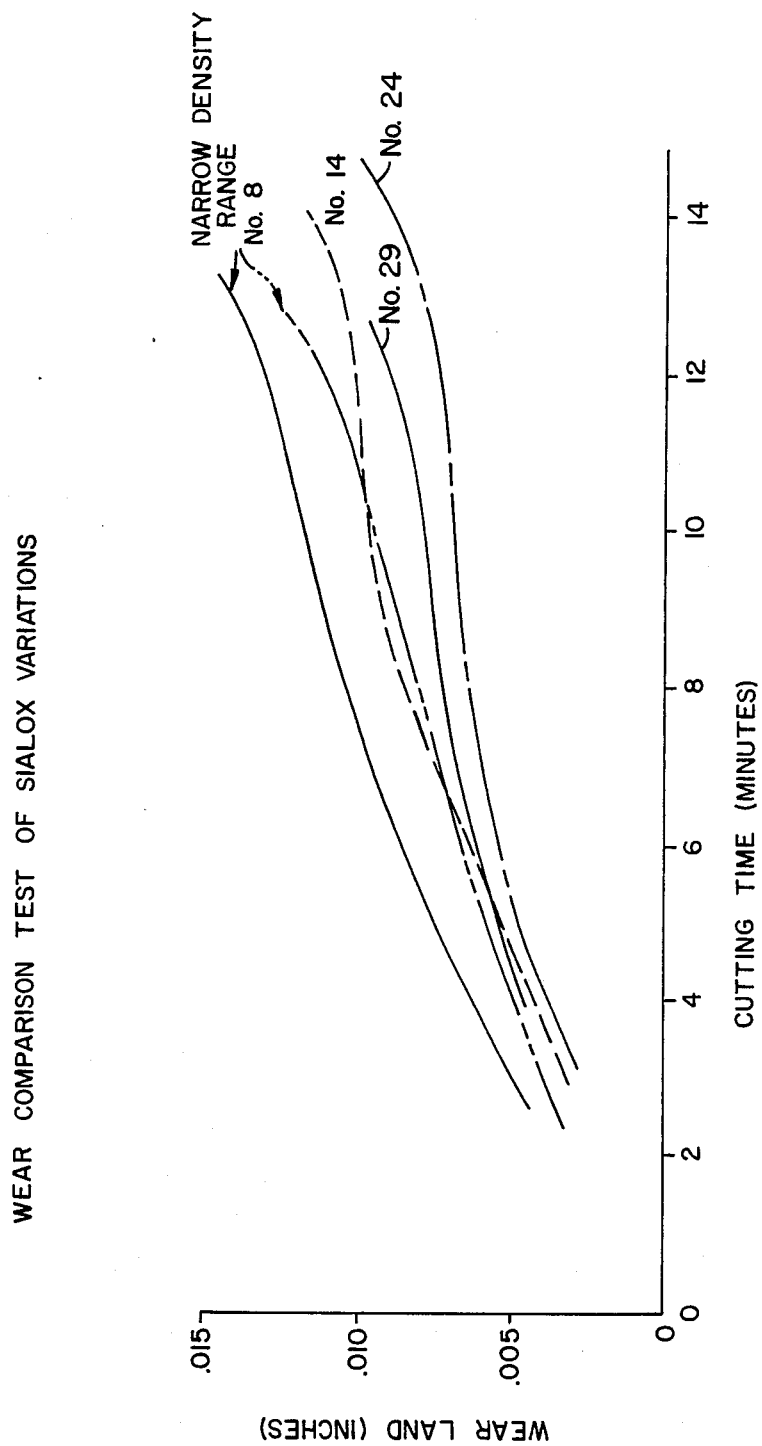

NOVEL COMPOSITIONS FOR OXIDE CERAMICS

DESCRIPTION

This application is a continuation in part of copending application Ser. No. 820,515, filed on Jan. 17, 1986, now abandoned, which was a continuation of application Ser. No. 550,869, filed Nov. 9, 1983, now abandoned.

TECHNICAL FIELD

This invention relates to novel oxide matrix ceramic compositions and more particularly to oxide matrix ceramics with high wear resistance and low materials cost.

BACKGROUND ART

Ceramic compositions based on alumina ($Al_2O_3$) have been in use for many years. Their applications in, e.g. the cutting tool industry have been recognized and utilized extensively. However, ceramics such as $Al_2O_3+ZrO_2$ and $Al_2O_3+TiC+ZrO_2$ have been criticized as being brittle or difficult to fabricate into complex shapes. Additional amounts of $ZrO_2$ have not been found to improve mechanical shock resistance and additional TiC has not significantly improved wear resistance.

The search for improved ceramic compositions has produced compositions known as SIALON, an acronym for silicon aluminum oxynitride. This composition in its most advantageous application consists primarily of beta-SIALON. However, this compound is one of the more expensive elements of ceramic composition and thus contributes to increased fabrication costs.

This difficulty has been recognized and other starting materials have been proposed which result through processing in a sialon composition from less expensive starting materials. See for example, U.S. Pat. No. 4,184,884.

Others have sought to improve the composition of ceramics available for cutting tool applications and the like through expensive fabrication techniques such as for example, hot isostatic pressing. However, this also results in increased fabrication costs even though the starting materials may be relatively abundant.

It has been recognized that the $Al_2O_3$ component of sialon can be increased, but uncertainty exists as to how much $Al_2O_3$ can be accomodated in this matrix. See for example U.S. Pat. No. 4,071,371 to Milberg et al.

Kamigaito et al. has disclosed a composition of $Si_3N_4$ and $Al_2O_3$ which also include AlN in widely varying amounts, U.S. Pat. No. 3,903,230.

DISCOSURE OF THE INVENTION

It is thus an object of the present invention to provide compositions for oxide matrix ceramics which have superior resistance to thermal shock, mechanical shock and abrasion.

It is another object of this invention to provide compositions for oxide matrix ceramics which utilize low cost starting material.

It is a further object of this invention to provide compositions of oxide matrix ceramics which possess superior resistance to thermal shock, mechanical shock and abrasion without requiring complex and expensive fabrication techniques.

These and further objects of the present invention will be realized by consideration of the following disclosure and appended drawings.

The present invention provides compositions for ceramics about 60 to 99% by weight of oxides, primarily $Al_2O_3$ about 0.1 to 15% by weight of nitride modifiers, and about 0 to 40% by weight of nitride, carbide or carbonitride dispersion particles.

BRIEF DESCRIPTION OF THE DRAWINGS

FIG. 1 is a ternary constitution diagram showing the composition ranges of the oxide matrix mixtures which form ceramic embodiments of the present invention.

FIGS. 2 thru 5 are graphs demonstrating the wear comparison between various ceramic embodiments made according to the present invention and commercially available ceramic tools.

BEST MODE FOR PRACTICING THE INVENTION

Figure 4A:
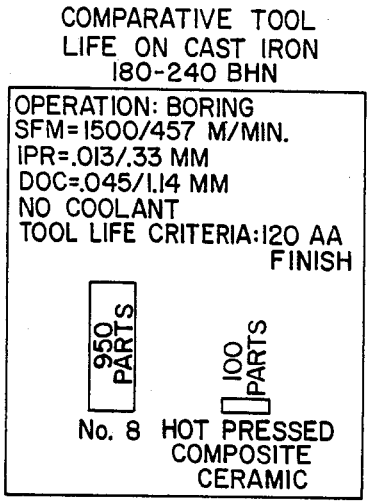

The oxide matrix ceramics provided by the present invention include a novel series of ceramic compositions which improve the performance of ceramics as, for example, wear parts, electronic substrates, cutting tools, and engine components. The limitations of ceramics composed of $Al_2O_3$ and $ZrO_2$, and $Al_2O_3$, TiC and $ZrO_2$ have been apparent in some metal cutting tool applications. These ceramic tool inserts have demonstrated sensitivity to thermal shock, mechanical shock and abrasion causing excessive wear or abrupt failure.

The present invention utilizes inexpensive and readily available oxides such as e.g. $Al_2O_3$, MgO, $ZrO_2$ as the basic ingredients or matrix ceramics, while varying the nitride modifier additives such as $Si_3N_4$ and AlN to improve this matrix in supporting and holding the dispersed particle additives such as e.g. SiC, TiC, TiN, $Ti_xn_y$, $TiC_xN_y$ (where $x+y=1$) and $B_4C$.

Oxides which are used in the present invention can include $Al_2O_3$, MgO, $ZrO_2$ and $HfO_2$. Of these oxides $Al_2O_3$ is most usually the major compound and the additions of other oxides are generally held to the range of approximately zero to 20 weight percent of the entire composition. These additional oxides can provide improvement in the composition of the predominately $Al_2O_3$ matrix by serving as grain growth inhibitors, and increasing the resistance of the resultant composition to shocks and abrasion. The oxide matrix is also substantially non-fibrous because fine, equal-axis alumina particles are used and the oxides are only heated to relatively low temperatures in the reaction hot pressing step of manufacture.

In numerous preferred embodiments of the present invention, MgO is added to the predominately $Al_2O_3$ matrix, generally in the range of approximately zero to 2 weight percent, to inhibit grain growth. Usually additions of MgO are in the range of approximately zero to 0.7 weight percent.

Additions of $ZrO_2$ and $HfO_2$ are also useful in preferred embodiments of the present invention. Such additions to the oxide matrix, generally in the range of approximately zero to 20 weight percent, have demonstrated improvements in the fracture toughness and thermal shock resistance of the predominately $Al_2O_3$ matrix embodiments of the present invention. However, substitution of $HfO_2$ for $ZrO_2$ is less frequent due to its increased cost and reduced effectiveness in crack blunting.

Additions of MgO and $ZrO_2$ or $HfO_2$ to the oxide matrix have also proven advantageous in certain embodiments of this invention, generally when the nitride modifier additions are in the range of zero to 15 weight percent of the composition.

These nitride modifers, when added to the predominantly non-fibrous aluminum oxide matrix, form a second phase, uniformly dispersed in the oxide phase by proper mixing prior to reaction hot pressing.

It has now surprisingly been found advantageous to include limited amounts of nitride modifiers and other dispersion particle compounds to obtain further improvements of the oxide matrix. These nitride modifiers include $Si_3N_4$ and AlN generally in the range of zero to 20 weight percent of the resultant composition. More usually, an advantageous composition representing an embodiment of the present invention is obtained with an addition of one to 15 weight percent of $Si_3N_4$ to the predominately $Al_2O_3$ matrix composition. In certain applications however additional improvements can be obtained by decreasing the amount of added $Si_3N_4$ and supplementing the matrix with AlN, together with the various dispersed particle compounds. In particularly preferred embodiments of this invention, 2 to 13 weight percent of nitride modifiers are added.

A third system component comprises dispersion particles. These dispersion particles, generally nitrides, carbides and carbonitrides, will also improve the wear resistance and hardness of the resultant ceramic composition and may be blended in various amounts in the composition to tailor the ceramic composition to a specific application. In general the particle dispersion compound consists of such compounds as TiC, TiN, ZrC, ZrN, HfC, HfN, $B_4C$, SiC, $TiC_xN_y$, $ZrC_xN_y$, and $HfC_xN_y$ where x plus y is generally in the range of approximately 0.5 to 1. These dispersed particles can be added to the ceramic composition generally to a final concentration of approximately zero to 40 weight percent. In preferred embodiments of the present invention, dispersed particles are added to a final concentration of about zero to 38.5 weight percent.

The selection of the appropriate nitrides, carbides and carbonitrides for the dispersed particles is generally dependent upon the specific application for the ceramic composition. The disclosed carbides harden the matrix and are generally preferred in the order: TiC, TiN, SiC, ZrC, $B_4C$ and HfC. The substitution of HfC is less frequent because of its higher cost and decreased effectiveness.

The addition and substitution of other nitrides and carbonitrides is generally only required when flank wear on tools is a problem, such as e.g. when cutting certain metals. Such additions and substitutions can reduce wear and ultimate tool failure up to approximately 50% in such applications. The substitution of carbonitrides is generally preferred over mixtures of carbides and nitrides because there is generally improved performance and less dispersion problems. However, the cost of carbonitrides is often higher than the mixture of carbides and nitrides.

These dispersion particles do not constitute part of either the oxide matrix or nitride phase. These particles are dispersed throughout but do not appear to participate in either phase of the matrix. The dispersion particle shape is also dependent upon the end use of the ceramic composition. Dispersion particle shapes include fine whiskers, fibers, platelets or equal-axis powders.

Turning to FIG. 1, the oxide matrix ceramics are shown as the major element or matrix with some substitution of nitride modifiers and other dispersion particles to improve this oxide matrix. The compositional tie line between 10 and 11 represent the approximate boundary of substitutional trade-offs between nitrides for matrix modifications and dispersion particles. The composition of this invention are those contained within the trapezoid on the diagram defined by the region bounded by 10-11-14-15.

The more preferred compositional mixtures are enclosed within the trapezoid marked 10-17-14-15. The compositions within this region provide the advantages of high oxide matrix content for low materials cost and ample matrix support for holding the dispersion particles. Within this region, there is provision for nitride substitution to allow matrix modifications which improve the oxide matrix for most existing applications in cutting tools, wear parts, electronic substrates and engine components.

Compositions contained within the boundary 14-15-16-17 provide even more benefit by their maximization of a high oxide matrix content with sufficient nitrides and dispersion particles to significantly improve the performance of the ceramics obtained therefrom, while maximizing the use of lowest cost starting materials.

In one preferred embodiment of the invention, from 2 to 15% of $Si_3N_4$ is added to the $Al_2O_3$ matrix.

The ceramics of the present invention are generally prepared by reaction hot pressing. This avoids pre-reaction treatment of the powders which increase the cost of fabrication and raw materials. In addition, the reaction assists in the densification of the resultant ceramic body, while avoiding the higher temperatures needed for pre-reacted powders. Such higher temperatures can increase grain growth and reduce the strength and toughness of the ceramic.

In general, fine powders (approximately 325 mesh) are pre-mixed and poured into a die cavity, which can be constructed e.g. of graphite. The mixture is then enclosed in the die with a punch which is capable of applying pressure of approximately 1,000 to 4,000 psi. While pressure is applied, the die is heated to the desired temperature, generally in the range of 1500° to 1650° C. The conditions of pressure and temperature are maintained for a sufficient time, generally 15 to 30 minutes, and often the reaction is carried out in an inert environment, e.g. under nitrogen. Thereafter the assembly is cooled to room temperature and the ceramic body is removed. Under these conditions, densities of 98% of theoretical, or greater, are achieved.

As an alternative, the compositions can be sintered by using pre-reacted powder and cold pressing at up to 30,000 psi. Thereafter, the composition can be sintered at 1,65020 to 1,800° C. under nitrogen for a period of from one to three hours depending on the size of the ceramic body.

The following examples are provided by way of illustration, and are not intended to limit the scope of the disclosure and its appended claims.

EXPERIMENTAL

The following Table 1 discloses compositions which illustrate embodiments of the present invention. Compositions are numbered and reference is made thereby. to the experimental examples and figures when appropriate.

TABLE 1

Examples of compositions evaluated for improving the performance of existing ceramic cutting tools (1, 2, 12, and 13):

| No. | $Al_2O_3$ | TiC | MgO | $ZrO_2$ | $Si_3N_4$ | AlN | TiN |
|---|---|---|---|---|---|---|---|
| 1 | 68.8 | 30.0 | 0.2 | | | | |
| 2 | 64.8 | 30.0 | 0.2 | 4.0 | | | |
| 3 | 70.0 | 0.1 | | | 29.9 | | |
| 4 | 70.0 | 0.2 | | | 29.8 | | |
| 5 | 70.0 | 0.5 | | | 29.5 | | |
| 6 | 70.0 | 15.0 | | | 15.0 | | |
| 7 | 75.0 | 5.0 | | | 20.0 | | |
| 8 | 85.0 | | | | 15.0 | | |
| 9 | 75.0 | | | | 20.0 | 5.0 | |
| 10 | 70.0 | | | | 20.0 | 10.0 | |
| 11 | 70.0 | | | | 15.0 | 15.0 | |
| 12 | 68.8 | 15.0 | 0.2 | | | | 15.0 |
| 13 | 64.8 | 15.0 | 0.2 | 4.0 | | | 15.0 |
| 14 | 70.0 | 7.5 | | | 15.0 | | 7.5 |
| 15 | 70.0 | | | | 15.0 | | 7.5 |
| 16 | 64.8 | 7.5 | 0.2 | 4.0 | 15.0 | | 7.5 |
| 17 | 70.0 | | | | 30.0 | | |
| 18 | 90.0 | | | | 10.0 | | |
| 19 | 87.0 | | | | 13.0 | | |
| 20 | 80.0 | 10.0 | | | 10.0 | | |
| 21 | 70.0 | 20.0 | | | 10.0 | | |
| 22 | 67.0 | 20.0 | | | 13.0 | | |
| 23 | 60.0 | 30.0 | | | 10.0 | | |
| 24 | 65.0 | 20.0 | | | 15.0 | | |
| 25 | 70.0 | 8.0 | | | 14.0 | | 8.0 |
| 26 | 70.0 | | | | 14.0 | | 16.0 |
| 27 | 64.8 | 8.5 | 0.2 | 4.0 | 14.0 | | 8.5 |
| 28 | 70.0 | 20.0 | | | 8.0 | 2.0 | |
| 29 | 91.0 | | | | 7.0 | 2.0 | |

It should be understood that in the present invention, as demonstrated by these examples, TiC can be supplemented or substituted by e.g. ZrC, HfC or TiNC. Furthermore, TiN can be supplemented or substituted by e.g. ZrN or HfN.

EXAMPLE 1

Seventy parts by weight of $Al_2O_3$ were mixed with 29.9 parts by weight of $Si_3N_4$ and 0.1 parts by weight of TiC, blended as very fine powders and formed into free flowing granules. This mixture (No. 3) was loaded into a mold of the desired shape and pressed in a nitrogen or inert environment at elevated temperature, allowing the oxides and nitrides to densify in a reaction hot pressing process as disclosed previously. The sintered ceramic tool bodies had a density greater than 98% of the theoretical.

The experimental tool was tested in a wear comparison with a tools of composition numbers 1, 2, 7, 8, 10 and 17 and the results on chilled cast iron are indicated in FIG. 2.

EXAMPLE 2

Seventy parts by weight of $Al_2O_3$ were mixed with 10 parts by weight of AlN and 20 parts by weight of $Si_3N_4$ (Composition No. 10). Ceramic tool bodies were prepared according to the method of Example 1. The sintered tools had a density greater than 98% of the theoretical. The wear comparison was performed between this composition (No. 10) and tools of composition numbers 3, 4, 8 and 17 on steel and the results were as indicated in FIG. 3.

EXAMPLE 3

Figure 4B:
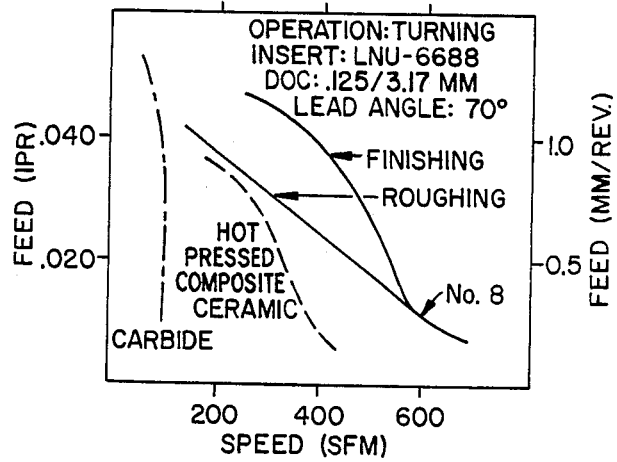
Figure 4C:
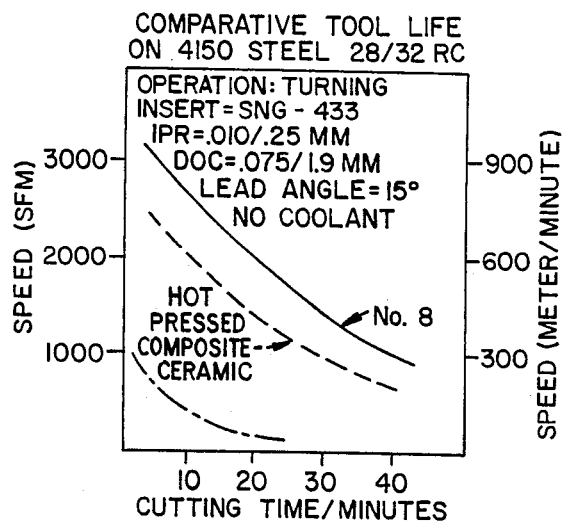
Figure 4D:
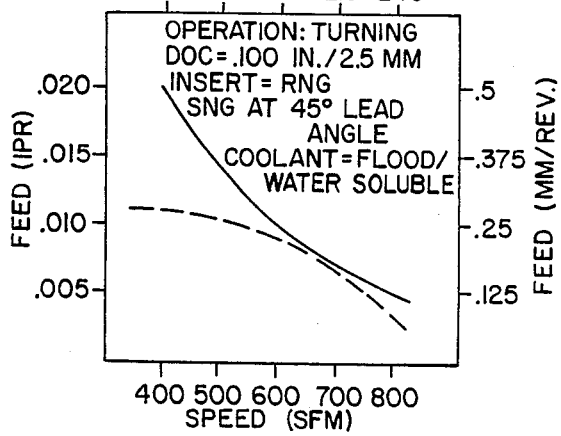

Eighty-five parts by weight of $Al_2O_3$ was mixed with 15 parts by weight of $Si_3N_4$ (composition no. 8) and ceramic tool bodies were prepared according to the method of Example 1. The sintered pieces had a density greater than 98% of theoretical. A wear comparison test was performed between this tool composition and commercially available tools of TiC - $Al_2O_3$ and WC - CO compositions and the results are as indicated in FIG. 4.

EXAMPLE 4

Seventy parts by weight of $Al_2O_3$ was mixed with 7.5 parts by weight of TiC, 15 parts by weight of $Si_3N_4$ and 7.5 parts by weight of TiN (composition no. 14). The ceramic tool bodies were prepared by the method of Example 1 and the sintered tools had a density greater than 98% of theoretical. A wear comparison was performed between the tool composition of this example and a tool of No. 8 composition. The results on steel were as indicated in FIG. 5.

In the examples above, it can be seen that comparisons of all compositions can be obtained by correlation with the composition No. 8. This composition was generally found to perform equal to or better than every other composition in the tests.

Although the foregoing invention has been described in some detail by way of illustration and example, for purposes of clarity of understanding, it will be obvious that certain changes and modifications may be practiced within the scope of the appended claims. As an example, in the composition set forth in the examples, the various additions detailed may be supplemented or substituted by alternative compound as previously disclosed.

I claim:

1. A ceramic composition for use in cutting tools, seal rings and wear resistant applications consisting essentially of:
   a predominantly aluminum oxide matrix;
   a second phase in said matrix comprising a uniform distribution of from 0.1 to 15.0 weight percent nitride modifiers selected from the group consisting of silicon nitride, aluminum nitride and mixtures thereof; and, 0.10 to 40.0 weight percent dispersion particles selected from the group consisting of TiC, TiN, ZrC, ZrN, HfC, HfN, $B_4C$, SiC, $Ti_xN_y$, $ZrC_xN_y$ and $HfC_xN_y$, where x plus y is in the range of 0.5 to 1.0, and mixtures thereof.

2. A ceramic composition as recited in claim 1 wherein the weight percent proportion of nitride modifiers is between 2 and 13 and the proportion of dispersion particles is between 0.10 and 38.5 weight percent.

3. A ceramic composition as recited in claim 1 wherein said silicon nitride modifier is present from 0.1 to 15.0 weight percent and said silicon nitride reacts with some of the aluminum oxide matrix to obtain a uniform finely dispersed second phase within the matrix.

4. A ceramic composition as recited in claim 1 wherein said nitride modifier mixture comprises at least 50.0 weight percent silicon nitride.

5. A ceramic composition as recited in claim 1 wherein said dispersion particles have a shape selected from the group consisting of fine whiskers, fibers, platelets or equal axis powder.

6. A ceramic composition as recited in claim 1 wherein said oxide matrix is further modified by the addition of at least one oxide compound selected from the group consisting of magnesium oxide, zirconium oxide and hafnium oxide, said total addition comprising 0.1 to 20 0 weight percent of the entire ceramic composition.

* * * * *